United States Patent [19]

Inaba et al.

[11] Patent Number: 4,829,416
[45] Date of Patent: May 9, 1989

[54] APPARATUS FOR CONTROLLING POWER TRANSDUCERS OF THE PULSE WIDTH MODULATION (PWM) CONTROL TYPE

[75] Inventors: Hiromi Inaba; Seiya Shima; Sadao Hokari, all of Katsuta; Toshimitsu Tobita, Hitachi; Hideaki Takahashi, Katsuta; Shigeta Ueda, Hitachi, all of Japan

[73] Assignee: Hitachi, Ltd., Tokyo, Japan

[21] Appl. No.: 2,199

[22] Filed: Jan. 12, 1987

[30] Foreign Application Priority Data

Jan. 11, 1986 [JP] Japan .................................. 61-2876
Jan. 11, 1986 [JP] Japan .................................. 61-2877

[51] Int. Cl.$^4$ ........................ H02M 7/527; H02P 5/40
[52] U.S. Cl. ...................................... 363/41; 318/811
[58] Field of Search ............... 318/811, 803, 807–810; 363/41, 42

[56] References Cited

U.S. PATENT DOCUMENTS

| | | | |
|---|---|---|---|
| 4,337,429 | 6/1982 | Stuart | 318/811 |
| 4,409,534 | 10/1983 | Bose | 318/811 |
| 4,581,693 | 4/1986 | Ueda et al. | 318/811 |
| 4,599,685 | 7/1986 | Honibu et al. | 363/41 |
| 4,634,952 | 1/1987 | Yoshino et al. | 318/811 |
| 4,654,773 | 3/1987 | Ito et al. | 363/41 |
| 4,672,285 | 6/1987 | Ito | 318/811 |
| 4,698,744 | 10/1987 | Itani et al. | 318/811 |

OTHER PUBLICATIONS

Sen et al., "Induction Motor Drives with Microcomputer Control System", Conference: IAS Annual Meeting, 1980, Cincinnati, OH, USA, Sep. 22–Oct. 3 1980.

Primary Examiner—David Smith, Jr.
Attorney, Agent, or Firm—Antonelli, Terry & Wands

[57] ABSTRACT

In a three phase inverter which is composed of transistors turned on or off in accordance with the PWM control, the pulse widths of PWM gate signals for the transistors are determined in accordance with the magnitudes of two of the three phases of the current to be output by the inverter.

The load of a processor for generating the gate signals can be reduced to the great extent, and in addition thereto, the waveform of the output current of the inverter is much improved.

11 Claims, 10 Drawing Sheets

FIG. 4
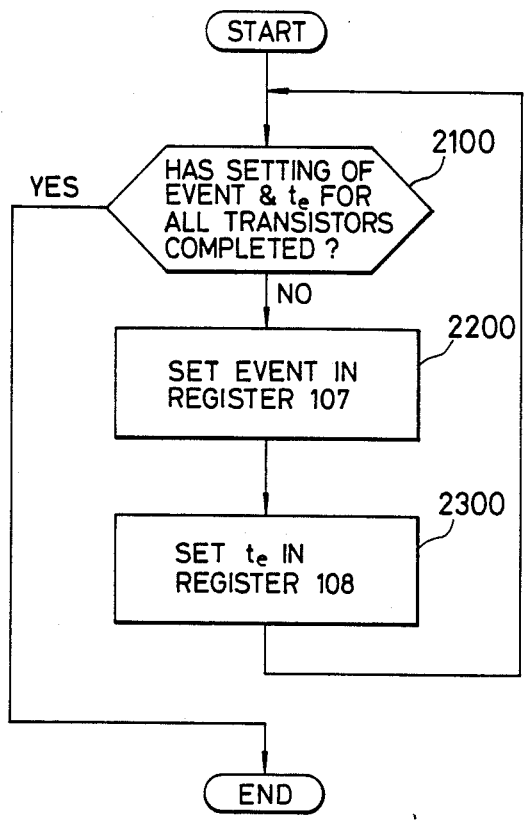
FIG. 5a TIMER INTERRUPTION 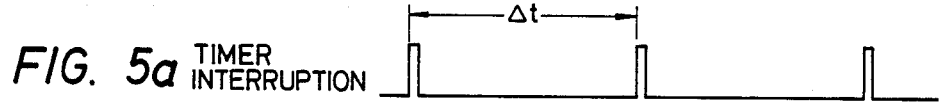
FIG. 5b FLOW 2000 
FIG. 5c FLOW 1000 
FIG. 5d TIMER INTERRUPTION 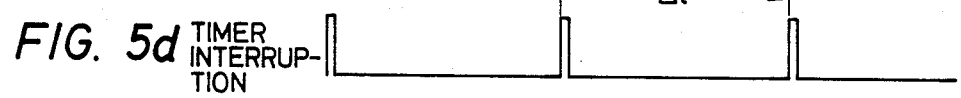

FIG. 7

| MODE | CONDITION θ_t | A | B | C | D |
|---|---|---|---|---|---|
| M1 | 0°~60° | 55 | 53 | 51 | 52 |
| M2 | 60°~120° | 51 | 55 | 56 | 54 |
| M3 | 120°~180° | 56 | 51 | 52 | 53 |
| M4 | 180°~240° | 52 | 56 | 54 | 55 |
| M5 | 240°~300° | 54 | 52 | 53 | 51 |
| M6 | 300°~360° | 53 | 54 | 55 | 56 |

A : TRANSISTOR TO BE ON IN THE OVERALL DURATION OF $\Delta t$
B : TRANSISTOR TO BE ON BETWEEN $t_0$ & $t_0 + t_{e1}$
C : TRANSISTOR TO BE ON BETWEEN $t_{e1}$ & $t_0 + t_{e2}$
D : TRANSISTOR TO BE ON AFTER $t_0 + t_{e2}$

FIG. 8

| θ | A | B |
|---|---|---|
| 1 | $t_{e11}$ | $t_{e21}$ |
| 2 | $t_{e12}$ | $t_{e22}$ |
| ⋮ | ⋮ | ⋮ |
| n | $t_{e1n}$ | $t_{e2n}$ |
| ⋮ | ⋮ | ⋮ |
| 60 | $t_{e160}$ | $t_{e260}$ |

$A : \begin{cases} t_{e1} = \Delta t \cdot \sin(\theta_t - 240°) & \text{FOR INVERTER} \\ t_{e1} = \Delta t \cdot \sin(\theta_t - 240°) \cdot \gamma^* & \text{FOR CONVERTER} \end{cases}$ $B : \begin{cases} t_{e2} = t_{e1} + \Delta t \cdot \sin\theta_t & \text{FOR INVERTER} \\ t_{e2} = t_{e1} + \Delta t \cdot \sin\theta_t \cdot \gamma^* & \text{FOR CONVERTER} \end{cases}$

APPARATUS FOR CONTROLLING POWER TRANSDUCERS OF THE PULSE WIDTH MODULATION (PWM) CONTROL TYPE

BACKGROUND OF THE INVENTION

1. Field of the Invention

The present invention relates to an apparatus for controlling power transducers of the pulse width modulation (PWM) control type, and more particularly to a control apparatus capable of remarkably improving the waveform of an AC input and/or output voltage or current of the transducers.

2. Description of the Related Art

Power transducers, such as converters converting AC power to DC power and inverters inverting DC power into AC power, are widely used in the various fields of industries. For one of typical examples, there is a power transducer which is constructed by the combination of a converter for converting AC voltage supplied from an AC power source to DC voltage and an inverter for inverting the DC voltage supplied by the converter into AC voltage again and applying the inverted AC voltage to an AC load such as an induction motor.

In this kind of the power transducer, the converter and the inverter are often controlled by the known PWM control. Then, the converter is desired to have the waveform of its AC input voltage, which is as close to a sinusoidal waveform as possible, and in the inverter its output voltage or current is required to be as close to a sinusoidal wave as possible. To meet this, especially the pulse width of the minimum input and/or output voltage or current pulses created by the PWM control should be sufficiently narrow.

In the following, the description will be made of the problem in the PWM control of the power transducer of this kind, taking the case of the inverter as an example. In the typical arrangement of the inverter, as is well known, a main switching circuit, which is composed of six semiconductor switching elements, such as transistors or gate-turn-off (GTO) thyristors, connected as a three phase bridge circuit, is supplied with a DC power through a DC reactor, and the six switching elements are fed with gate signals in accordance with the PWM control to repeat turn-on and turn-off operations in the predetermined manner. As a result, the output voltage or current and the frequency thereof can be controlled.

Thus, in the PWM control system of such inverter generally known in the prior art, a triangular carrier wave and a sinusoidal modulating wave are compared with each other, and gate signals for the switching elements are obtained in accordance with the comparison result.

If an apparatus for such PWM control is realized by the analog circuit components, it is accompanied by a problem of complicated circuit construction requiring a carrier wave generator, a modulating wave generator, a comparator and so on. Further, the apparatus constructed by such analog circuit components still has another problem that the characteristics remarkably fluctuate with the changes in the ambient temperature and the aged deterioration so that it is difficult to obtain the stable operation thereof.

Then there has been proposed an apparatus constructed by the digital circuit components; Japanese Utility Model Laid-open No. 57-3392 published on Jan. 8, 1982, for example. According thereto, both a carrier wave and a modulating wave are generated in the form of digital signals, and gate signals for the switching elements are produced by comparing the digital carrier wave and the digital modulating wave. If the control operation, i.e., the generation of the gate signals as mentioned above, is achieved by a microcomputer thus programed, it is almost occupied by the calculating operation for generation of the various waves and the comparison thereof, so that it can hardly execute other processes.

In this case, moreover, the apparatus mentioned above requires the tremendous amount of storage capacity for storing data for the various carrier waves and the various modulating waves in order to obtain the AC output voltage with the good sinusoidal waveform over the wide range of the frequencies of the AC output voltage. This is not practical because of the construction of data storage means. If the distorted AC output voltage of an inverter is applied to an induction motor as a load of the inverter, for example, another problem is that generation of noise and torque ripple resulting from harmonic components included in the distorted waveform is unavoidable.

SUMMARY OF THE INVENTION

It is therefore an object of the present invention to solve the aforesaid problems and to provide an apparatus for controlling a PWM-controlled power transducer, by which the waveform of an AC input and/or output voltage or current of the power transducer is much improved.

According to one of the features of the present invention, there is provided, in a control apparatus for a PWM-controlled power transducer, a processor, which calculates a total phase by using at least a frequency instruction and determines one of the modes of the on-off states of switching elements of the power transducer in accordance with the calculated composite phase angle. The respective modes are composed of plural events, each of which includes the information of the pattern of the on-off states of the switching elements. The plural events of a mode have particular enabling times and, every time a certain time comes, one of the events which is accompanied by the enabling time having the same as the certain time is selected. In this manner, the plural events in a mode are repeated for every predetermined time interval during the mode while being changed over at the enabling time, and gate signals for the switching elements are produced in accordance with the event selected at that time. The enabling times are determined by dividing the predetermined time interval in accordance with the magnitudes of at least two of the three phases of the voltage or current of the AC power which is to be supplied to or derived from the power transducer.

As a result, the widths of pulses of the gate signals are so varied that, when the power transducer is controlled with such gate pulses, the waveform of the voltage or current of the AC power to be supplied to or derived from the power transducer is made a sinusoidal one.

BRIEF DESCRIPTION OF THE DRAWINGS

FIG. 4. is a flow chart showing a process of setting the determined events and the enabling times thereof;

FIGS. 5a to 5d are time charts for explaining the timing of execution of the processes shown in FIGS. 2 and 4;

FIG. 7 is an example of a mode determination table indicating the relation of the on-off states of transistors of the transducer with respect to modes;

FIG. 8 is an example of an enabling time table indicating the relation of the enabling times with respect to the total phase $\theta_t$;

DESCRIPTION OF THE PREFERRED EMBODIMENT

Figure 1A:
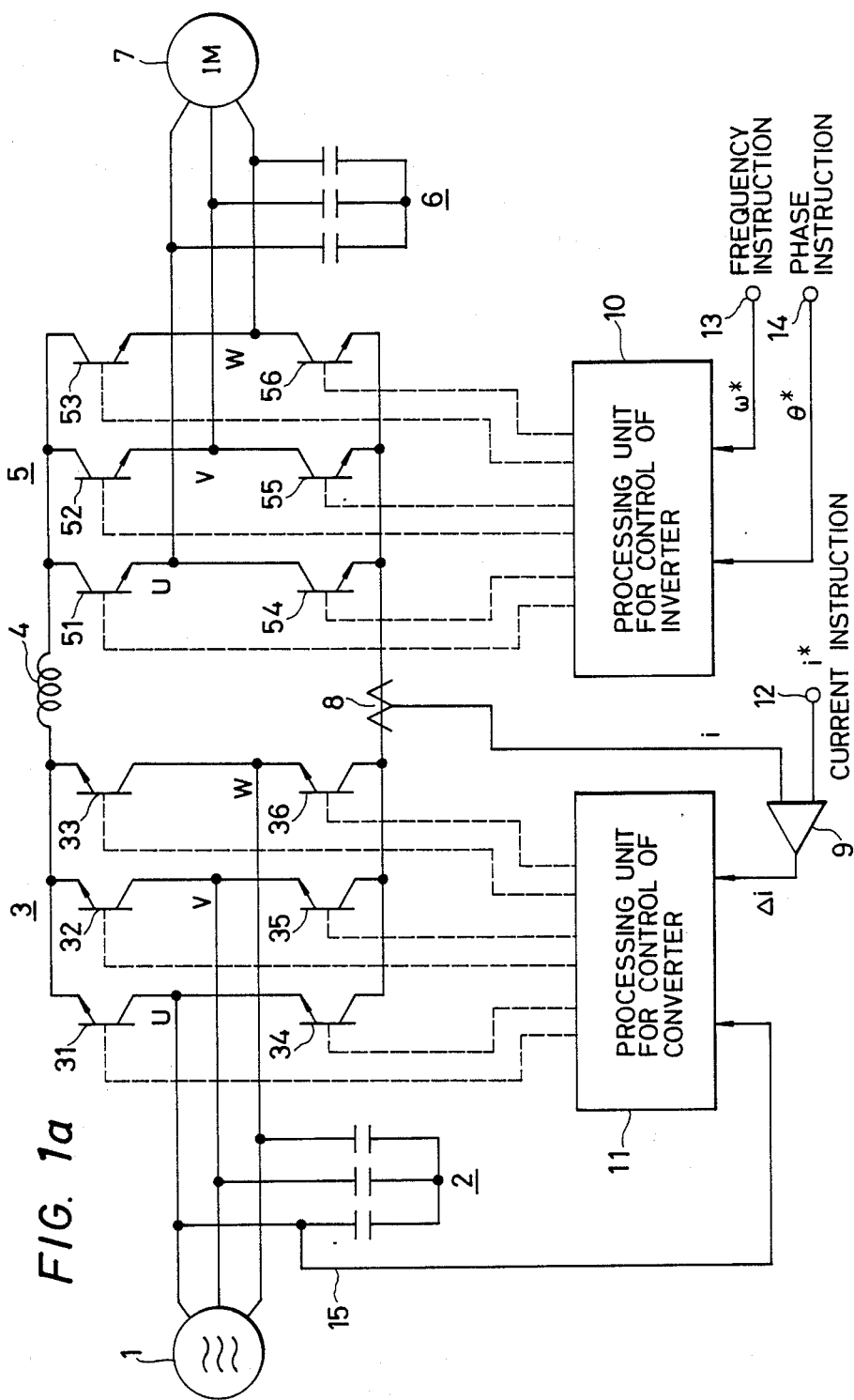
FIGS. 1a and 1b show an induction motor control device including an apparatus for controlling a PWM-controlled power transducer in accordance with an embodiment of the present invention.
Figure 1B:
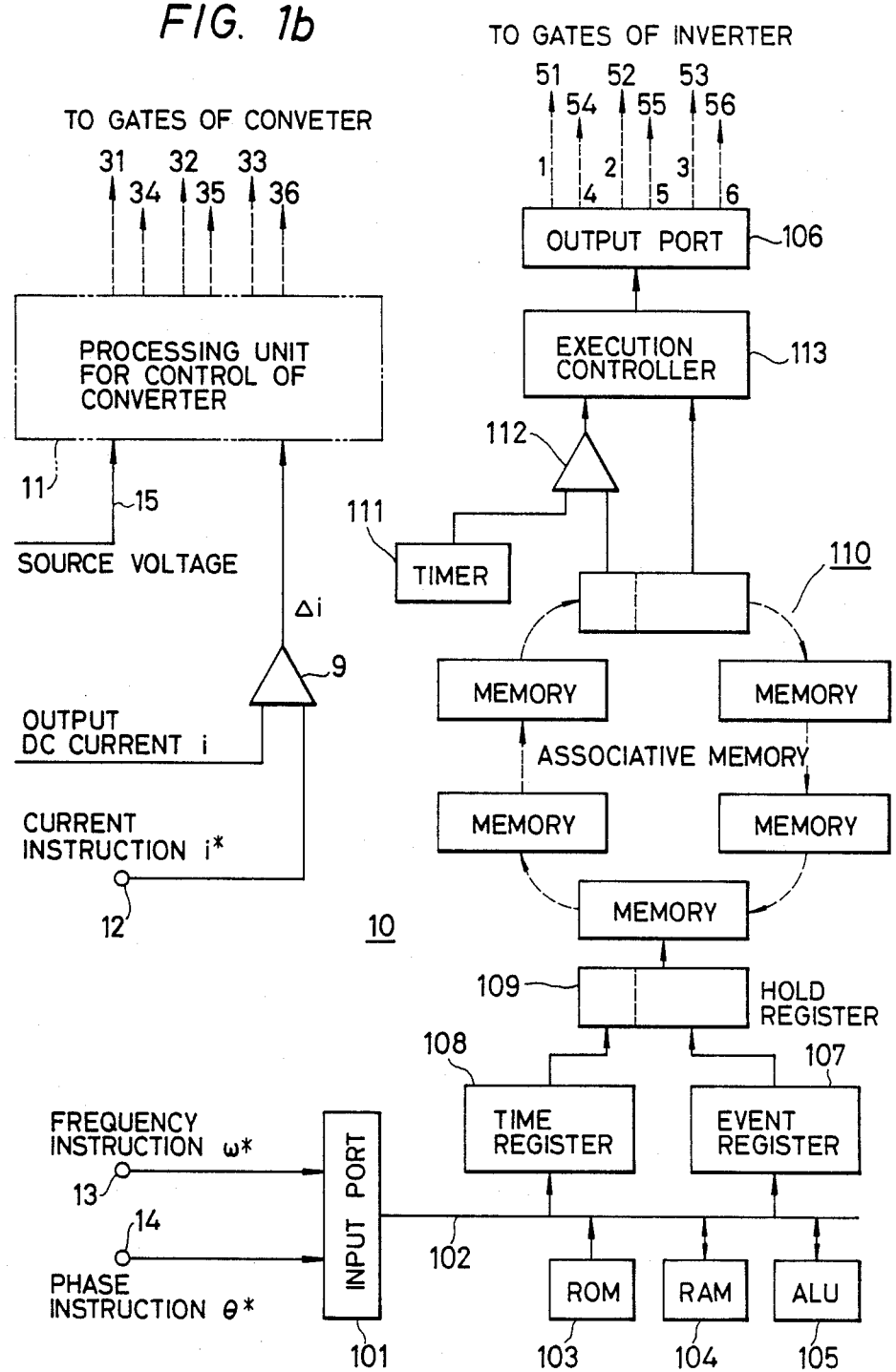

In FIGS. 1a and 1b showing an embodiment of the present invention, reference numeral 1 denotes a three phase AC power source, 2 a filter capacitor in the input side and 3 a three phase converter composed of transistors 31 to 36, as main switching elements, connected as shown. Reference numeral 4 denotes a DC reactor and 5 a three phase inverter composed of transistors 51 to 56, as main switching elements, connected as shown. As apparent from the figure, the converter 3 and the inverter 5 form a so called current source power transducer. Reference numeral 6 indicates a filter capacitor in the output side and 7 an induction motor as a load of the transducer. Reference numeral 8 indicates a DC current detector and 9 a comparator which compares a current instruction i* with an actual current i detected by the detector 8.

Reference numerals 10 and 11 denote processing units, which are formed by a microcomputer and produce gate control signals for the transistors 31 to 36 and 51 to 56. The processing unit 10 for the inverter 5 and the processing unit 11 for the converter 3 have almost the same construction. Accordingly, the description herein will be based mainly on the processing unit 10 for the inverter 5, any different construction and operation relative to the processing unit 11 for the converter 3 being described as needed.

Reference numeral 12 is a terminal through which the current instruction i* is applied to the processing unit 11 for the converter 3. To the processing unit 11 applied is a signal from the AC power source 1 through a line 15 for the purpose of making gate signals for the transistors 31 to 36 of the converter 3 in synchronism with the voltage of the AC power source 1. Reference numerals 13 and 14 are terminals through which a frequency instruction $\omega^*$ and a phase instruction $\theta^*$ are supplied to the processing unit 10 for the inverter 5.

The processing unit 10 has an input port 101 and an internal bus 102 connected thereto. To the bus 102 coupled are a read only memory (ROM) 103 for storing programs and tables for data of pulse widths, a random access memory (RAM) 104 used for registers and temporary storage of operation results and an arithmetic logic unit (ALU) 105 for executing various arithmetic logic operations. These components construct a known data processor. The operation result of this processor is output from an output port 106 after it is subjected to the processing described later.

The processor composed of ROM 103, RAM 104 and ALU 105 interconnected by the bus 102 produces events for controlling the on-off operation of the transistors 51 to 56 in accordance with the PWM control on the basis of the frequency instruction $\omega^*$ and the phase instruction $\theta^*$. The events are stored in ROM 103, and each includes the information of what transistors are to be on and what transistors are to be off in a certain time duration. Further, the processor also determines the time at which a predetermined event is to be enabled. For the convenience' sake, this time is called an enabling time hereinafter. Although the details will become apparent later, a series of the events read out from ROM 103 time-serially determines the on-off patterns of the respective transistors, which correspond to the pattern of the gate signals for the transistors. Therefore, those also correspond to the pulse patterns of the current flowing through the respective transistors.

In addition to the processor as described above, the processing unit 10 further includes the following peripheral devices for controlling the output signals, i.e., an event register 107 for temporarily storing an event determined by the processor, a time register 108 for also temporarily storing an enabling time corresponding to the event stored in the register 107 at that time and a hold register 109 for coupling the contents of both the registers 107 and 108 and holding them.

The peripheral devices further include an associative memory 110, which, as is well known, is a data storage device in which a location is identified by its informational content rather than by addresses and from which the data may be retrieved. The memory 110 takes data thereinto, which are successively given from the hold register 109. Every data, as already described, is made up of an event and an enabling time accompanied thereby, and therefore the respective events stored in this memory 110 are retrieved by the particular times thereto, that is to say, when a certain time comes, the event accompanying the enabling time, which is the same as the certain time, is read out. In this case, therefore, the time corresponds to the above described informational content for identification of the location.

In FIG. 1b however, for the purpose of the easy understanding of the operation of the memory 110, data stored in the memory 110 are circulated cyclically, an enabling time portion of every data is compared, with the time supplied by a timer 111 in a comparator 112, and when both coincide with each other, an execution controller 113 is triggered by the output of the comparator 112 to read out an event portion accompanying the enabling time from the memory 110.

According to the data of the event read out, the execution controller 113 actuates ports Nos. 1 to 6 of the output port 106 selectively. The signals appearing at the selected ports Nos. 1 to 6 are led to the corresponding transistors 51 to 56.

Figure 2:
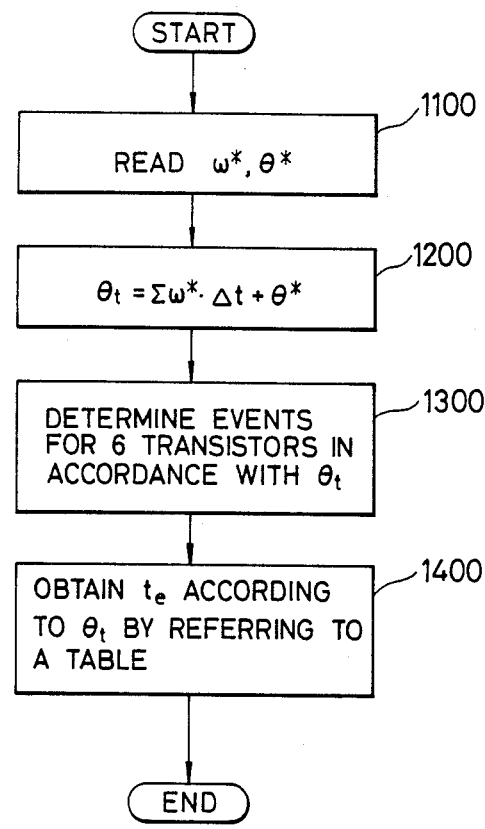
FIG. 2 is a flow chart showing a process of determining events and enabling times at which the respective events are enabled.

The operation of the control apparatus mentioned above will be explained in the following. FIG. 2 is a schematic flow chart showing a processing program 1000 for determining events and obtaining enabling times $t_e$. First of all, at step 1100, the frequency instruction $\omega^*$ and the phase instruction $\theta^*$ are read into the processor through the input port 101. In case a speed instruction and an actual speed are given, the frequency instruction $\omega^*$ and the phase instruction $\theta^*$ can be calculated in the processor, and then step 1100 is substituted by a step at which the speed instruction and the actual speed are taken.

Figure 3:
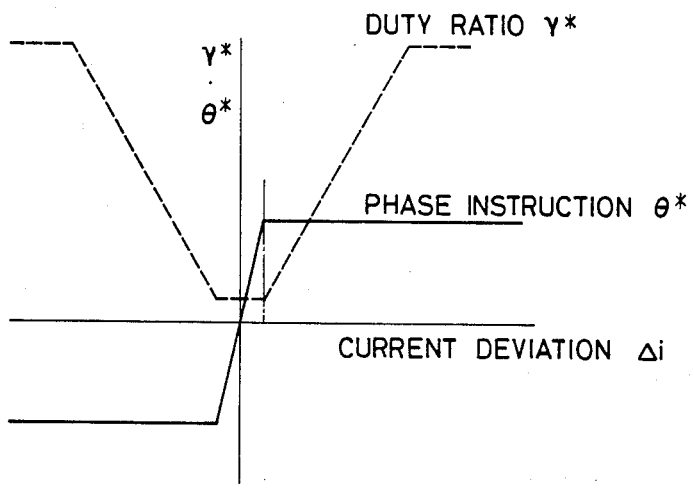
FIG. 3 shows the relation of the duty ratio $\gamma^*$ and the phase instruction $\theta^*$ with respect to the current deviation $\Delta i$ for explaining the control operation in the case of an converter.

Incidentally, in the case of the control for the converter 3, the frequency of the AC power source 1 is used as the frequency instruction $\omega^*$. To this end, the processing unit 11 takes thereinto the signal in synchronism with the source voltage through the line 15. The phase instruction $\theta^*$ is determined in accordance with a current deviation $\Delta i$ between the current instruction $i^*$ and the actual current $i$, as shown in FIG. 3.

Namely, until the phase instruction $\theta^*$ reaches a predetermined value, phase instruction $\theta^*$ increases with the current deviation $\Delta i$ while the duty ratio $\gamma^*$ of the on-off operation of the converter 3 maintained at its minimum value. When the phase instruction $\theta^*$ reaches the predetermined value, the duty ratio $\gamma^*$ increases up to its maximum value with the current deviation $\Delta i$ with the phase instruction $\theta^*$ maintained at the predetermined value. If, however, the converter 3 is subjected to only the control of the duty ratio $\gamma^*$, not to the control of the phase instruction $\theta^*$, that is, the converter 3 is not required to produce the output voltage close to zero and the phase instruction $\theta^*$ can be maintained at zero.

Next, at step 1200, the frequency instruction $\omega^*$ is integrated for every predetermined time period $\Delta t$, and the integration result is added to the phase instruction $\theta^*$ to obtain a total phase $\theta_t$. The aforesaid time period $\Delta t$ is determined by a timer interruption, and therefore the period $\Delta t$ represents an interruption interval. Thereafter, at step 1300, events for the transistors 51 to 56 are determined in accordance with the total phase $\theta_t$ obtained at step 1200. Particular events are prepared for respective one of six modes obtained by dividing one cycle of the AC current produced by the inverter 5, i.e., an electric angle of 360°, by 60°, and one of them is selected in accordance with the total phase $\theta_t$. The relationship between the total phase $\theta_t$ and the modes will be described in more detail later.

Finally, at step 1400, enabling times $t_e$, within the interruption interval $\Delta t$, at which the changeover of the events is conducted, are obtained by referring to an enabling time table stored in ROM 103 by the composite phase angle $\theta_t$. In this manner, this process determines the event to be stored in the event register 107 and the enabling time to be stored in the time register 108, and as already described, both are coupled in the hold register 109 and then stored in the associative memory 110.

In the following, a process 2000 for setting the two items thus obtained into the associative memory 110 will be explained with reference to FIG. 4. At step 2100, it is discriminated whether or not setting of an event and an enabling time te for all the transistors 51 to 56 has been completed. If yes, the process is ended. Otherwise an event is set into the register 107 at ste 2200 and then an enabling time $t_e$ is set into the register 108 at step 2300. This loop operation is repeated until the setting operation is completed.

FIGS. 5a to 5d show the timing of both the processes 1000 and 2000 mentioned above. In FIGS. 5a to 5c, the setting process 2000 is initiated every timer interruption which occurs every $\Delta t$, and after the completion of this process 2000, the process 1000, by which the event and the enabling time to be used in the process 2000 executed in the succeeding interruption interval, is started. In this case, since the time necessary for discrimination of the interruption is short, the interruption interval $\Delta t$ can be shortened. Therefore, the apparatus can operate at the high frequency.

If a second timer interruption signal as shown in FIG. 5d, which is caused prior to the timer interruption signal shown in FIG. 5a, is provided and the process 1000 is started by the second timer interruption signal, as shown by dotted lines in FIG. 5c, the newest data can be set in the setting process 2000.

As described above, according to the embodiment, after the predetermined events and the enabling times accompanying the events have been set into the associative memory 110 through the registers 107 and 108 and the hold register 109, the associative memory 110 plays the role of the control of the output port 106 so that the processor composed of ROM 103, RAM 104 and ALU 105 is released from the output control processing.

Figure 6:
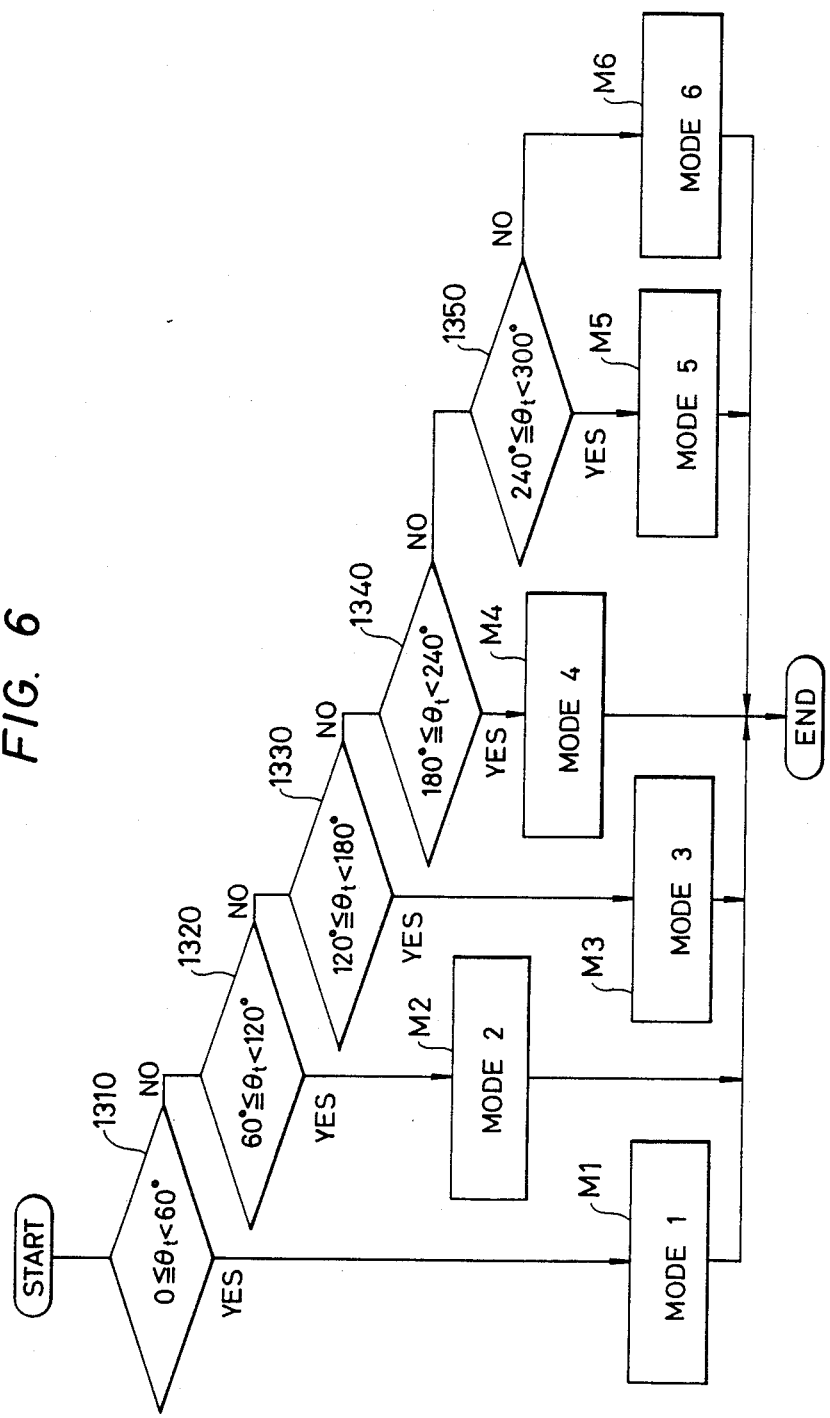
FIG. 6 is a flow chart showing a process of discriminating a mode in accordance with a total phase $\theta_t$.

Referring next to FIG. 6, step 1300 in FIG. 2, i.e., the determination step of the events, will be explained. In the case of the inverter control of this embodiment, as already described, the six modes are changed at every 360° in the electric angle of the AC output current of the inverter 5. Namely, the six modes are circulated within one cycle of the AC output current of the inverter 5, and one of them is selected in accordance with the calculated composite phase angle $\theta_t$. For this purpose, the range of the present total phase $\theta_t$ is discriminated at steps 1310 to 1350, and one of the six modes M1 and M6 is selected in response to the discrimination result.

Further, in case the total phase $\theta_t$ as the result of the calculation at step 1200 comes out of the region of 0° to 360°, the region check of making the addition or subtraction of 360° to return the total phase $\theta_t$ within the range of 0° to 360° is conducted at the beginning of the processing of step 1300. As will be described later, every mode is composed of plural events; three events in this embodiment.

In FIG. 7 there is shown, for the modes M1 and M6, the combination of the transistor to be on in the overall duration of the timer interruption interval $\Delta t$ and the transistors to be on only for the respective periods defined by the enabling times within the interruption interval $\Delta t$. A group of the later transistors includes the transistor to be on from the beginning time point $t_0$ of the interruption interval $\Delta t$ to the time point $t_0+t_{e1}$, the transistor to be on from the time point $t_0+t_{e1}$ to the time point $t_0+t_{e2}$ and the transistor to be on from the time point $t_0+t_{e2}$ to the end of the interruption interval $\Delta t$, i.e., $t_0+\Delta t$.

If, therefore, the present total phase $\theta_t$ is discriminated, the mode is determined to identify the transistors 51 to 56 to be on or off. Further, the transistors not indicated in the table of FIG. 7 are maintained to be off during the whole period of the respective modes.

If the on state of the transistor is represented by "1" and the off state thereof by "0", the events become as follows:

|  | Transistors | | | | | | Event No. |
| --- | --- | --- | --- | --- | --- | --- | --- |
|  | 51 | 52 | 53 | 54 | 55 | 56 |  |
| (Port No. | 1 | 2 | 3 | 4 | 5 | 6) |  |
| Mode 1 | 0 | 0 | 1 | 0 | 1 | 0 | 11 |
|  | 1 | 0 | 0 | 0 | 1 | 0 | 12 |
|  | 0 | 1 | 0 | 0 | 1 | 0 | 13 |
| Mode 2 | 1 | 0 | 0 | 0 | 1 | 0 | 21 |
|  | 1 | 0 | 0 | 0 | 0 | 1 | 22 |
|  | 1 | 0 | 0 | 1 | 0 | 0 | 23 |
| Mode 3 | 1 | 0 | 0 | 0 | 0 | 1 | 31 |
|  | 0 | 1 | 0 | 0 | 0 | 1 | 32 |
|  | 0 | 0 | 1 | 0 | 0 | 1 | 33 |
| Mode 4 | 0 | 1 | 0 | 0 | 0 | 1 | 41 |
|  | 0 | 1 | 0 | 1 | 0 | 0 | 42 |
|  | 0 | 1 | 0 | 0 | 1 | 0 | 43 |
| Mode 5 | 0 | 1 | 0 | 1 | 0 | 0 | 51 |
|  | 0 | 0 | 1 | 1 | 0 | 0 | 52 |
|  | 1 | 0 | 0 | 1 | 0 | 0 | 53 |
| Mode 6 | 0 | 0 | 1 | 1 | 0 | 0 | 61 |
|  | 0 | 0 | 1 | 0 | 1 | 0 | 62 |
|  | 0 | 0 | 1 | 0 | 0 | 1 | 63 |

Incidentally, when noting the transistor 51 in the table above, for example, it will be understood that it repeats the on-off states in accordance with the pattern "010" for every interruption interval $\Delta t$ in the whole duration of the mode 1. Namely, the transistor 51 is maintained nonconductive for a first period within the interruption interval $\Delta t$, then made conductive for a second period, and made nonconductive again for a third and last period.

Similarly, with respect to the transistor 52, the pattern of its on-off operation is "001", and with respect to the transistor 53 "100". The pattern of the transistor 55 is "111", and this pattern means that it is maintained conductive through the whole duration of the mode 1. The transistors 54 and 56 are kept nonconductive through the whole duration of the mode 1. These patterns are the pulse patterns which have been already described. The same as mentioned above is applied to the cases of other modes 2 to 6.

Further, the aforesaid first period corresponds to the period from the beginning time point t0 of the interruption interval $\Delta t$ to $t_0 + t_{e1}$, and the time point $t_0 + t_{e1}$ is called a first enabling time. The above mentioned second period is from $t_0 + t_{e1}$ to $t_0 + t_{e2}$, and the time point $t_0 + t_{e2}$ is called a second enabling time. The last period is from $t_0 + t_{e2}$ to the end of the interruption interval $\Delta t$, i.e., $t_0 + \Delta t$.

Next, let us note the on-off states of the whole transistors 51 to 56 at a certain time, i.e., view the table above in the transverse direction. The pattern of "0" and "1" when thus viewed indicates the event, i.e., the information of what transistors are to be on and what transistors are to be off, at a certain time point.

Accordingly, in the mode 1, for example, the transistors 51 to 56 are made on or off in accordance with the event No. 11 from the beginning of the interruption interval $\Delta t$, and the event No. 11 is changed over to the event No. 12 at the first enabling time $t_0 + t_{e1}$. After that, the transistors 51 to 56 are made on or off in accordance with the event No. 12. When the second enabling time $t_0 + t_{e2}$ comes, the event No. 12 is changed over to the event No. 13, and the transistors 51 to 56 are controlled in accordance therewith until the end of the interruption interval $\Delta t$, i.e., $t_0 + \Delta t$.

To sum up, the three events belonging to the mode 1 are repeated for every interruption interval $\Delta t$ through the whole duration of the mode 1 while being changed over at the enabling times $t_{e1}$ and $t_{e2}$. As a result, the on-off states of the transistors 51 to 56 are repeated for every interruption interval $\Delta t$ during the mode 1. The same is true of the cases of other modes 2 to 6.

With reference to FIG. 8, a process for obtaining the first and second enabling times $t_{e1}$ and $t_{e2}$, i.e., step 1400 in the flow chart of FIG. 2, will be described in the following. Since the output current of the inverter 5 is required to be of the sinusoidal wave when viewed at terminals of the filter capacitor 6, the present embodiment uses the method of distributing the interruption interval $\Delta t$ on the basis of a ratio of the magnitudes of $\sin(\theta_t - 120°)$ and $\sin(\theta_t - 240°)$ having a phase difference of 120° with respect to $\sin \theta_t$. In other words, the enabling time $t_{e1}$ and $t_{e2}$ are determined as a function of the total phase $\theta_t$ by the following formulas:

$$t_{e1} = \Delta t \cdot \sin(\theta_t - 240°)$$

$$t_{e2} = t_{e1} + \Delta t \cdot \sin \theta_t$$

The obtained values $t_{e1}$ and $t_{e2}$ are tabulated with respect to the total phase $\theta_t$ and stored in ROM 103 or RAM 104 in advance. Therefore, they can be retrieved by the total phase $\theta_t$.

In FIG. 8, the values of $t_{e1}$ and $t_{e2}$ are tabulated only for one mode, i.e., with respect to the range of 60°. From the relationship of the waveforms of three sinusoidal waves having the phase difference of 120° from one another, however, it will be understood that the enabling times in other modes can be determined by shifting the values of the enabling times obtained from the table of FIG. 8 by the amount corresponding to the angular difference of the respective modes from the one mode.

Figure 9:
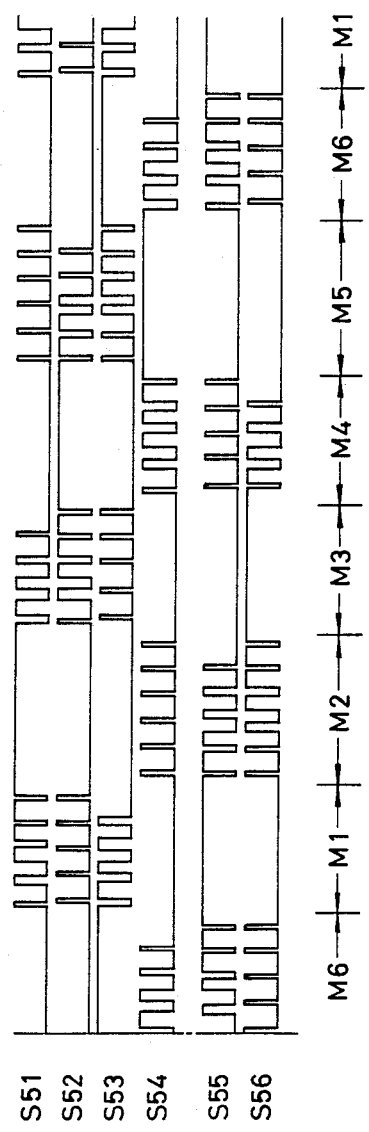
FIG. 9 is a chart showing a time relation of the gate signals applied to the transistors.

There is shown in FIG. 9 examples of gate signals S51 to S56 for rendering the transistors 51 to 56 on or off, which are obtained in the above mentioned manner and output from the ports Nos. 1 to 6 of the output port 106. The waveforms shown are determined by the aforesaid pulse patterns, in which, however, the time factor is taken into consideration.

FIGS. 10a to 10g show the details of a part, i.e., the mode 1 only, of FIG. 9. FIG. 10a shows three sinusoidal waves U, V and W, which have the phase difference of 120° from one another, only for the period of 60°. These sinusoidal waves correspond to the output current of the inverter 5 viewed at the terminals of the filter capacitor 6.

In the mode 1, as apparent from the table of FIG. 7, the gate signals are given to the transistors 51 to 53 and 55. Thereamong, the transistor 55 is given the gate signal through the whole period of the mode 1, as shown in FIG. 10f. Within the interruption interval $\Delta t$, the transistor 53 is given the gate signal from $t_0$ to $t_0 + t_{e1}$, as shown in FIG. 10d. Similarly, the transistor 51 is given the gate signal from $t_0 + t_{e1}$ to $t_0 + t_{e2}$, and then the transistor 52 is given the gate signal from $t_0 + t_{e2}$ to $t_0 + \Delta t$, as shown in FIGS. 10b and 10c. As a result, the currents flowing through the respective transistors have the same waveforms as shown in FIGS. 10b to 10d.

As shown in the figure, the pulse widths u, v and w of the gate signals S51, S52 and S53 are proportional to the magnitudes u, v and w of the corresponding sinusoidal waves U, V and W shown in FIG. 10a. Therefore, the output currents of the inverter 5, which have the same waveforms as shown in FIGS. 10b to 10d, are averaged by the filter capacitor 6 to become the sinusoidal waves as shown in FIG. 10a.

By the way, during the interval when gate signal S52 exists, a DC side of the inverter 5 is short-circuited by the transistors 52 and 55 made conductive simultaneously, and the charge of the filter capacitor 6 is discharged toward the induction motor 7 in that duration. In view of the improvement of the waveform, i.e., obtaining the preferable sinusoidal wave, it is desirable that the minimum pulse width of the gate signal S52 is as narrow as possible; ideally zero. However, the minimum of this duration is limited to the discharge time mentioned above. The value $v_0$ in FIG. 10a is determined in accordance with the discharge time, and the value v is measured in view of the value $v_0$.

In the case of the control of the converter 3, the above mentioned formulas for obtaining the first and second enabling times $t_{e1}$ and $t_{e2}$ are necessary to be modified as follows, because the control of the duty ratio $\gamma^*$ is conducted in the inverter 3:

$$T_{e1} = \Delta t \cdot \sin(\theta_t - 240°) \cdot \gamma^*$$

$$T_{e2} = t_{e1} + \Delta t \cdot \sin\theta_t \gamma^*$$

Namely, the enabling times $t_{e1}$ and $t_{e2}$ in this case are obtained in accordance with the product of the duty ratio $\gamma^*$ and the magnitudes of the two sinusoidal waves. Further, in this case, when the duty ratio $\gamma^*$ is small, both $t_{e1}$ and $t_{e2}$ become also small. As apparent from FIGS. 10b to 10d, if $t_{e1}$ and $t_{e2}$ are small, $\Delta t - (t_{e1} + t_{e2})$ becomes large, namely the duration, in which the upper and lower transistors of the same phase are conductive simultaneously, and $\Delta t$ is extended so that the decrease of the duty ratio $\gamma^*$ is realized.

Figure 10:
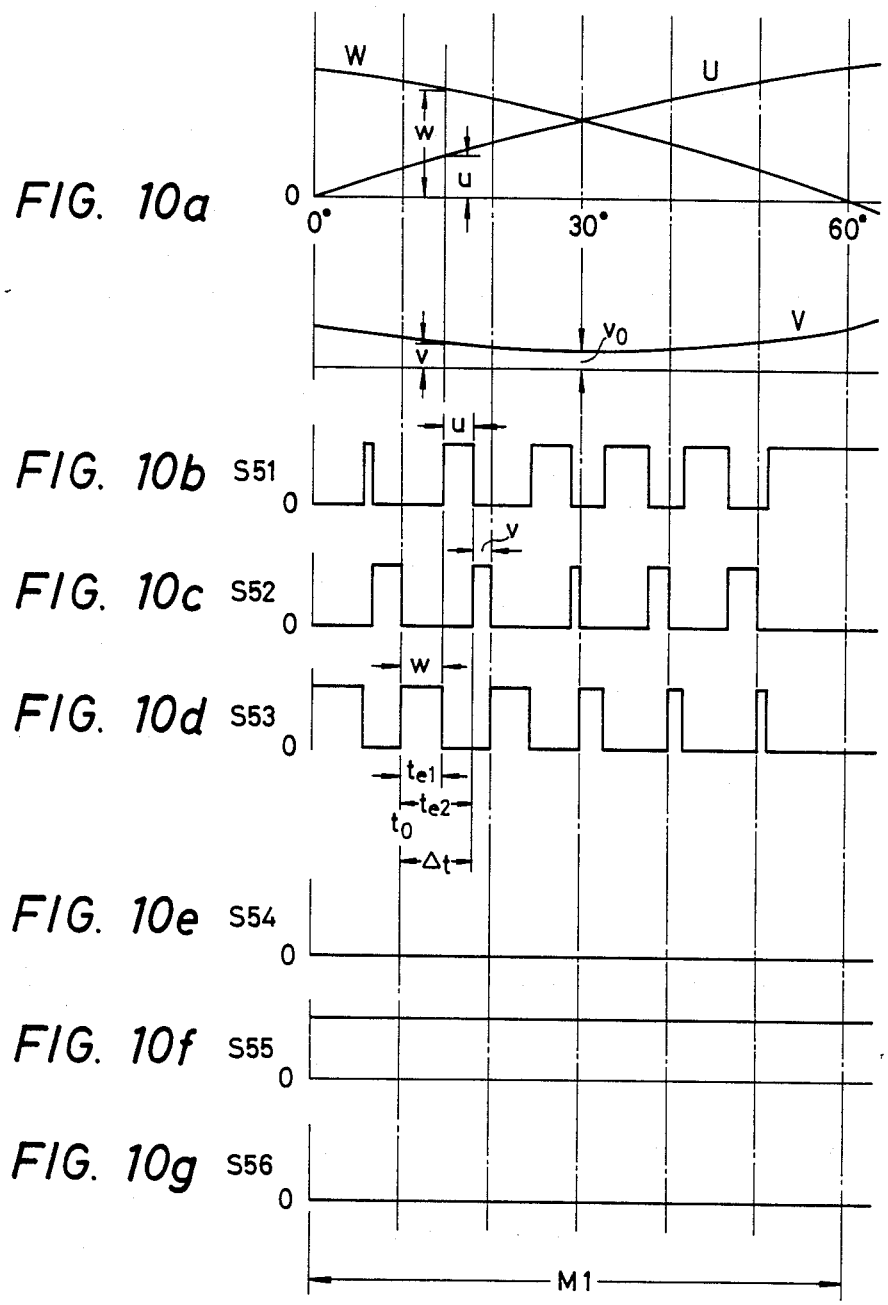
FIGS. 10a to 10b show the detailed time relation of the gate signals for the transistors with respect to the waveform of the output current.
Figure 11:
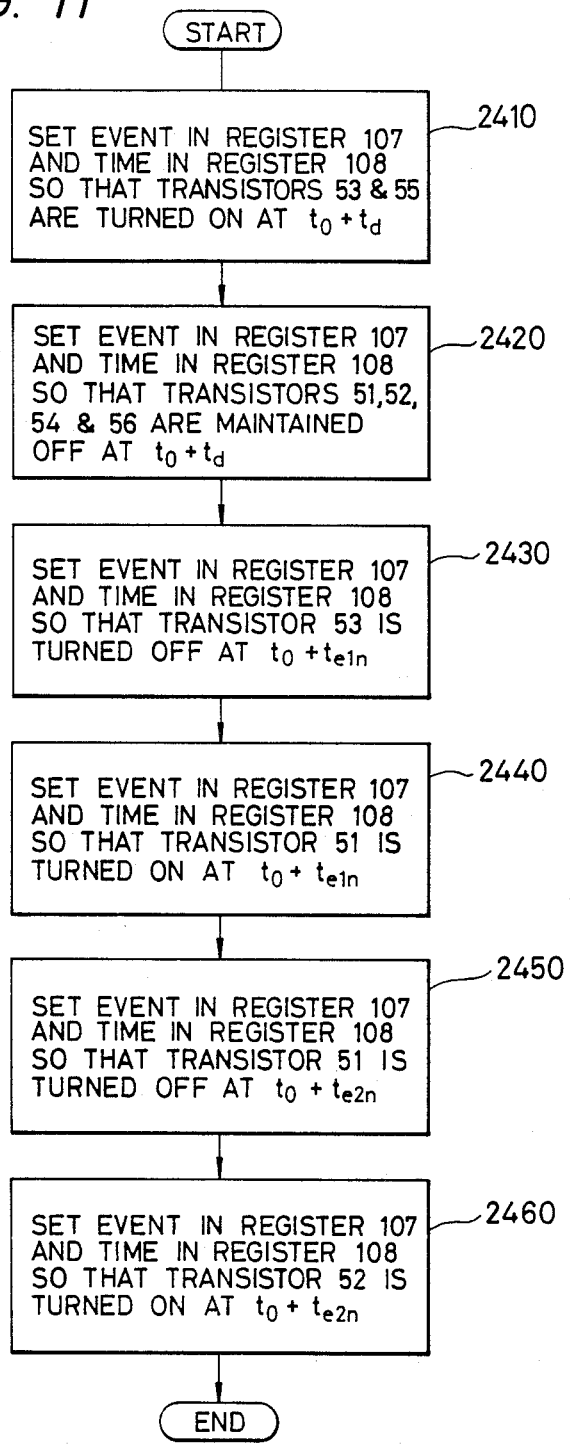
FIG. 11 is a flow chart showing a process within one timer interruption interval by which the events and the enabling times thereof are set.

Next, there is shown in FIG. 11 in detail a flow chart of the event setting process, which is embodied by taking the mode 1 indicated in detail in FIGS. 10a to 10g as an example. Further, although, in FIG. 4, the flow chart of this process has been illustrated with the loop construction so as to facilitate the understanding, this process actually flows in series as shown in FIG. 11.

FIG. 11 shows the flow of the processing for one interruption interval $\Delta t$ from time $t_0$ to time $t_0 + \Delta t$ shown in FIG. 10. First of all, at step 2410, the event No. 1 (cf. the table already indicated) and the time $t_0 + t_d$ are set in the registers 107 and 108, respectively, so that the transistor 55, which is maintained conductive through the whole period of the interruption interval $\Delta t$, and the transistor 53, which is conductive between $t_0$ and $t_0 + t_{e1}$, are turned on at the time point $t_0 + t_d$.

In other words, the event setting is conducted in the register 107 so that the signals "1" may be generated at the ports Nos. 3 and 5 corresponding to the transistors 53 and 55, and the time setting is conducted such that a predetermined time $t_d$ is added to the present time point $t_0$ and the additional result is set in the register 108.

Since, at this time, the turn-on of the transistors 53 and 55 is necessary to be instantly effected, a value as small as possible should be selected of the predetermined time $t_d$. As a result, the event and the enabling time are taken into the associative memory 110 through the hold register 109. When the timer 111 indicates the time $t_0$, the event is read out from the associative memory 110, and after the lapse of time $t_d$ from the time $t_0$, the signals "1" are output to the transistors 53 and 55 through the ports Nos. 3 and 5.

The addition of the predetermined time $t_d$ is conducted for the following reason. A certain time necessarily elapses by the time the event is set in the associative memory 110 and read out therefrom. Therefore, the setting of $t_0$ without the addition of $t_d$ would not result in coincidence in the comparator 112 so that the event could not be given to the output port 106.

At step 2420, under the assumption of the possible change of the operation mode due to the abrupt change of the phase instruction $\theta^*$, for example, it is confirmed whether or not the transistors to be off at that time are really made off. For this process, the associative memory 110 is used in the same manner as the process 2410. Since the event in this process is to make the transistors nonconductive, it is so set that the signals "0" may be generated at the ports Nos. 1, 2, 4 and 6.

After that, the process that the transistor 53 may be made off at time $t_0 + t_{e1n}$ is conducted at step 2430. The event is set such that the signal "0" is output at the port No. 3, and the time is set at $t_0 + t_{e1n}$. At step and 2440, moreover, the event is so set that, at the time $t_0 + t_{e1n}$, the transistor 53 is made on and the transistor 53 is made off.

Incidentally, here are set at the same time point the turn-off of the transistor 53 and the turn-on of the transistor 51. However, it is possible to make the following consideration in order to prevent the occurrence of overvoltage. Namely, the times teln set in steps 2430 and 2440 are made different from each other so that, in a current source inverter, the conductive period of both the transistors 53 and 51 is overlapped and, on the contrary, it is not overlapped in a voltage source inverter.

Next, at step 2450, the event and the time are set such that the transistor 51 is turned off at the time $t_0 + t_{e2n}$, and at step 2460, the setting of the event and the time is conducted such that the transistor 52 is turned on at the time $t_0 + t_{e2n}$.

Figure 12:
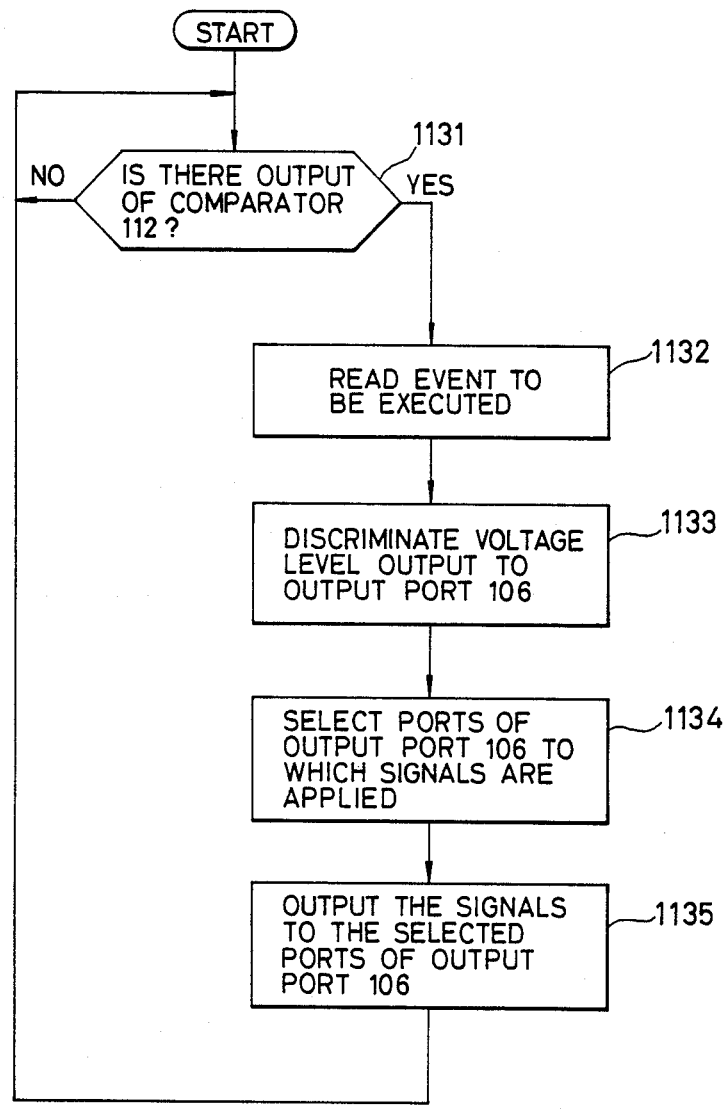
FIG. 12 is a flow chart showing a process of an execution controller of the control apparatus shown in FIG. 1b.

Referring next to FIG. 12, the explanation will be made of the operation of the execution controller 113. At step 1131, it is discriminated whether or not there is an output of the comparator 112, which is produced when there exists the time stored in the associative memory timer 111. This discriminating operation is repeated until the output of the comparator 112 is found.

If the output of the comparator 112 occurs, the event to be executed is read out at step 1132. Namely, when the time elapses and the set time comes, the event accompanying the set time is read out. At step 1133, the voltage level to be output at the output port 106 is discriminated. At step 1134, it is determined what transistors 51 to 56 are to be turned on or off, and the voltage level of the ports corresponding to the transistors to be turned on is made at "1". At step 1135, the signals are output to the selected ports of the output port 106.

Thus, in the present embodiment described above, the processor portion included in the processing unit 10 only conducts, for every interruption $\Delta t$, the processes of calculating the composite phase angle $\theta_t$ and determining the events deciding the transistors to be on and off on the basis of the composite phase angle $\theta_t$ and the times enabling those events. After completion of the aforesaid processes, the processing result is delivered to the output control portion comprising the associative memory and its related parts and subjected to the processing necessary for driving the transistors.

As is different from the system of the prior art in which the carrier wave and the modulating wave are compared with each other, therefore, it is made possible not only to eliminate the difficulty that the processor portion is restrained by the continuous comparison of the two waves through the control of the inverter but also to attain the improvement of the output current.

The description thus far made has been directed to the embodiment in which the total phase $\theta_t$ is calculated by using the frequency instruction $\omega^*$ and the phase instruction $\theta^*$ while considering the so called vector control of an induction motor. It is to be understood, however, that a load of the inverter and the control method thereof have nothing to do with the essential point of the present invention. In case, therefore, it is sufficient to give only the frequency instruction $\omega^*$, the essence of the present invention is not deteriorated even if the composite phase angle $\theta_t$ maybe calculated by the following formula while omitting the phase instruction $\theta^*$, substituted for the formula indicated at step 1200 in the flow chart of FIG. 2;

$$\theta_t = \Sigma \omega^* \cdot \Delta t$$

Further, in the description above, the synchronization with the source voltage in the case of the control of the converter has not been referred to. In this respect, the following methods can be adopted; a method of synchronizing a series of processes mentioned above which are repeated for every interruption interval $\Delta t$ with the zero cross point of the source voltage, or a method of resetting the calculated composite phase angle $\theta_t$ by a signal occurring at every zero cross point of the source voltage. However, the present invention is not limited to any particular method of synchronization.

In the above mentioned embodiment, moreover, as shown in FIG. 8, the first and the second enabling times are provided with respect to only the range of 60° of the variation of the composite phase angle $\theta_t$ so as to reduce the capacity of the table. If, however, the range is enlarged to 360°, there can be attained an effect that the troublesome operation of determining the enabling times by converting the calculated total phase $\theta_t$ into the section of 60° is eliminated although the capacity of the table will increase.

Further, in FIG. 1b, a programmable input/output function within a one-chip microcomputer used as the processing unit 10 was employed for the schedule processing in the event setting process. In case the number of the ports becomes short or in case the programmable input/output within the one-chip microcomputer is not available due to checking of the port output signals, an external input/output having the similar function can be used.

Hereinafter, the change in the timer interruption interval $\Delta t$ has not been described. For the application, however, in which the switching frequency of the transistors has to be varied based on external factors such as the temperature rise of the components, the necessary change in the interruption interval $\Delta t$ can be satisfied merely by adding such a function as to alter the enabling times $t_{e1}$ and $t_{e2}$ in proportion to the change in the switching frequency.

According to the present invention, the input or output waveform of a PWM-controlled power transducer of the digital control type using a microcomputer can be remarkably improved and made very close to the sinusoidal wave. As a result, when the present invention is applied to a PWM-controlled power transducer for controlling an induction motor, there can be attained an effect that the noise and the torque ripple can be reduced to the great extent.

We claim:

1. An apparatus for controlling a power transducer capable of converting DC power into three phase AC power and/or vice versa by means of a pulse width modulation (PWM) control, having a processing unit for producing gate signals which turn on and off switching elements of the power transducer, said processing unit comprising:

memory means including a first area for storing data of events, according to which the on or off states of the respective switching elements are determined, the combination of three different events determining an operational mode of the power transducer, said operational mode being defined by dividing one cycle of voltage or current of the three phase AC power into six;

said memory storing means including also a second area for storing data of enabling times with respect to predetermined phase angles of the voltage or current of the three phase AC power, at which enabling times a constant timer interruption interval of said processing unit is divided into three subdivided intervals in proportion to the magnitudes of the voltage or current of the respective phases of the three phase AC power and corresponding events are enabled;

processing means adapted so as to execute, for every timer interruption interval, a step of calculating a composite phase angle on the basis of at least a frequency or frequency instruction of the three phase AC power, a step of determining one of the operational modes in accordance with the calculated composite phase angle; and a step of reading out three events belonging to the determined mode and corresponding enabling times by retrieving said memory means in accordance with the calculted composite phase angle and the determined operational mode; and output control means, including a timer, for selecting one of the read-out events every time when the timer indicates a time coincident with an enabling time accompanied with an event to be selected to thereby produce the gate signals of the switching elements in accordance with the content of the selected event at the time of the corresponding enabling time.

2. An apparatus for controlling a power transducer according to claim 1, wherein the mode determining step executed by said processing means is conducted by retrieving the first area of said memory means in accordance with the calculated composite phase angle, the first area including for every operational mode the information of a switching element to be on over the whole duration of the constant time interruption interval and switching elements to be on only during the particular subdivided intervals.

3. An apparatus for controlling a power transducer according to claim 1, wherein enabling times for a first operational mode only are stored in an enabling time table provided in the second area of said memory means and enabling time for other operational modes are determined by shifting the values of the enabling times obtained from the table by the amount corresponding to the phase difference of the respective operational modes from the first operational mode.

4. An apparatus for controlling a power transducer according to claim 1, wherein enabling times for all the operational modes are stored in an enabling time table provided in the second area of said memory means.

5. An apparatus for controlling a power transducer according to claim 1, wherein the constant timer interruption interval is varied based on the temperature rise of the switching elements.

6. An apparatus for controlling a power transducer according to claim 1, wherein said output control means has an associative memory which temporarily stores the events and the enabling times accompanied by the respective events which are read out by execution of the reading-out step in the processing means, and one of the events stored therein is derived therefrom by using the time indicated by the timer as the informational content for identifying the location where the corresponding event is stored.

7. An apparatus for controlling a power transducer according to claim 1, wherein the composite phase angle is calculated in said processing means by adding a phase instruction of the voltage or current of the three phase AC power to the value obtained by integrating the frequency or its instruction of the voltage or current of the three phase AC power for every constant time interruption interval.

8. An apparatus for controlling a power transducer according to claim 1, wherein the power transducer comprises means for converting three phase AC source power into DC power, and the composite phase angle is calculated on the basis of a frequency of voltage or current of the AC source power and a phase instruction which is determined in accordance with the deviation between a current instruction and an actual current output by the converter.

9. An apparatus for controlling a power transducer according to claim 1, wherein the power transducer comprises means for converting three phase AC source power into DC power of the variable voltage by controlling the duty ratio of the on-off operation of switching elements of the converter, and the enabling times are determined in accordance with the product of the duty ratio and the magnitudes of voltages of at least two phases of the AC source power.

10. An apparatus for controlling a power transducer according to claim 1, wherein the power transducer comprises means for converting three phase AC source power into DC power, and a series of the steps executed by said processing means for every timer interruption interval is synchronized with a zero cross point of voltage of the AC source power.

11. An apparatus for controlling a power transducer according to claim 1, where the power transducer comprises means for converting three phase AC source power into DC power, and the composite phase angle is reset for every zero cross point of voltage of the AC source power.

* * * * *